May 23, 1961
R. A. LATTIZZORI
2,985,858
ELECTRICAL INDUCTION APPARATUS
Filed Nov. 16, 1959
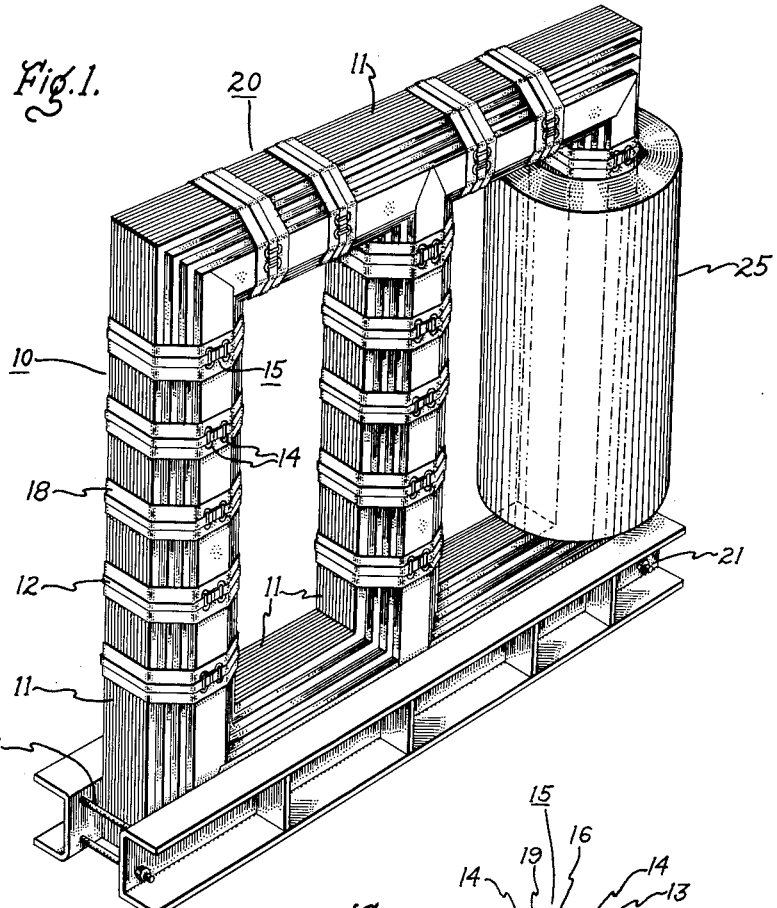
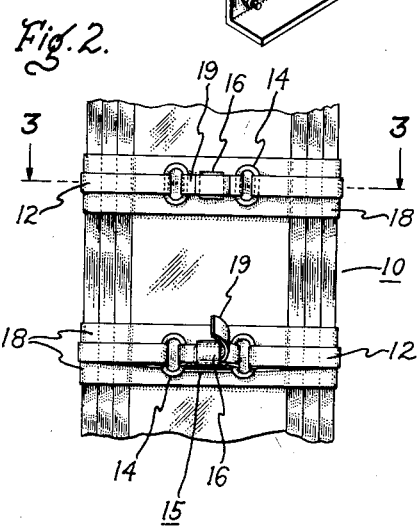
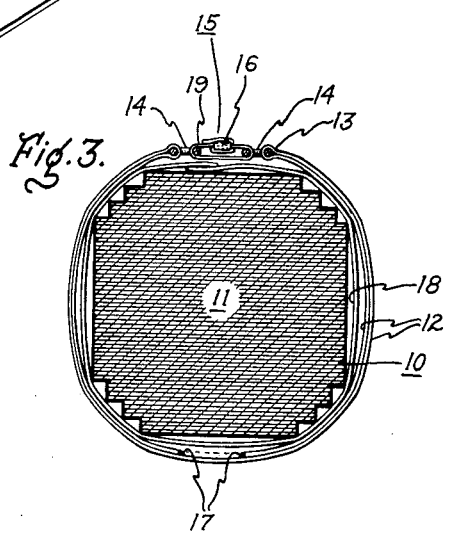
Inventor,
Richard A. Lattizzori,
by Gilbert P. Tarleton
His Attorney.

United States Patent Office 2,985,858
Patented May 23, 1961

2,985,858

ELECTRICAL INDUCTION APPARATUS

Richard A. Lattizzori, Dalton, Mass., assignor to General Electric Company, a corporation of New York Filed Nov. 16, 1959, Ser. No. 853,130

6 Claims. (Cl. 336—210)

This invention relates to a core for electrical induction apparatus and a method of making same.

Electrical induction apparatus, and in particular transformers, have a core of magnetic material which is often made by laminating a plurality of plates or strips of such material together. According to conventional practice, a plurality of bolts are passed through aligned transverse holes in adjacent plates of the magnetic material. This arrangement for securing the core laminations together has many inherent disadvantages. Among the disadvantages are the increased manufacturing cost incurred in punching thousands of holes in plates of magnetic material, such as iron or steel, aligning the holes, and then passing a bolt therethrough; also, the bolts must be insulated from the core plates, so costly expedients, such as insulating cylinders surrounding each bolt, must be employed. Furthermore, it has been found that the use of bolts to hold the core laminations together increases the noise produced by the apparatus when it is in operation because the holes punched to accommodate the bolts result in a reduction in the effective flux carrying cross sectional area of the core.

Several methods of laminating core plates that do not employ bolts have been tried without success. These included binding the plates circumferentially with a metal wire or band; this resulted in a short circuited turn because the magnetic flux in the core induces a current in closed metal loops that surround it. A modification of the closed metal loop arrangement was the use of a metal wire or band that did not completely enclose the core but had its ends connected by a short piece of non-conducting material, such as a flat piece of nylon formed into the shape of a buckle; the metal element was insulated from the core by a strip of insulation around the core. This arrangement was unsatisfactory because breaking of either the metal or the non-conducting element would cause a short circuit when the metal element fell to the bottom of the apparatus where it would contact adjacent components. Also, if the strip of insulation were to become dislodged from between the core and metal element, a short circuited turn would exist where the ends of the metal element contacted the core. A still further modification of the above arrangement was the coating or surrounding of the metal element with insulation, and also joining its ends with a non-conducting fastener. This had the same drawback as the previously described arrangement because wearing away of the insulation could cause a short circuit and consequent failure of the transformer. Another unsuccessful arrangement was the spirally wrapping of a continuous web of insulating material, such as cloth, around the core in a manner similar to which a mummy is wrapped; this was unsuccessful because the wrappings could not be tightened sufficiently to keep the core plates in contact with each other.

Accordingly, it is an object of my invention to provide an improved means for laminating together the strips or plates forming the core in an electrical induction apparatus.

It is another object of my invention to provide an improved method for laminating together the strips or plates forming the core in an electrical induction apparatus.

Briefly stated, in accordance with one aspect of my invention, I provide an improved arrangement for laminating a plurality of strips or plates of magnetic material into a core by means of a web of non-conducting or insulating material surrounding the core that has its ends joined by adjustable fastening means. According to another aspect of my invention, I provide a method of laminating a plurality of strips or plates of magnetic material into a core for an electrical induction apparatus by placing the plates of material into contact with each other, partially surrounding the plates with a web of insulating material, joining the ends of the insulating material together with a connecting band, and tightening the band so that the web binds the laminations together.

My invention will be better understood from the following description taken in connection with the accompanying drawing and its scope will be pointed out in the appended claims.

Figure 1 is a perspective view of an electrical induction apparatus made in accordance with my invention.

Figure 2 is an enlarged perspective view of a portion of Figure 1.

Figure 3 is a cross sectional view through the line 3—3 of Figure 2.

Referring now to Figure 1, therein is illustrated an induction apparatus of the type having cores 10 made of a plurality of strips or plates 11 of magnetic material, such as silicon steel or iron. The cores 10 may be connected by yoke members 20 and clamps 21, and coils 25 may surround certain cores according to conventional practice. While the embodiment chosen for illustration is a transformer having a plurality of aligned core elements, it is obvious that my invention is equally suitable for use on other types of induction apparatus, such as those having only one core element.

The plates 11 are held together by a web 12 of non-conducting or insulating material. Although any insulating material, such as a sheet of plastic, or cloth made from organic and/or inorganic fibres, may be employed for the web 12, it has been found that glass tape possesses superior properties as far as dielectric and mechanical strength, and resistance to stretching are concerned. The web 12 may either be plain, or it may be coated or filled with a resinous material to increase its strength and resistance to abrasive wear and stretching. The resinous material may be either natural or synthetic, and resins of the epoxy type have been found to greatly inhibit the stretching and wearing of the web material. Consequently, epoxy filled glass tape, .030″ thick x .750″ wide, obtained from Minnesota Mining and Manufacturing Company as Uni-Directional 1002 has been employed as the web 12 in a preferred embodiment of my invention. When the epoxy-filled type of tape is used, the resin is conventionally uncured, and the web must be heated after it is applied to the core to set the resin. The web of insulating material may be protected from the sharp edges of the core laminations by means of strips 18 of insulation, such as high water finished kraft paper, it being obvious that any suitable insulating material may be employed without departing from the spirit and scope of the invention.

The end portions of the web of insulating material 12 are folded back upon themselves as shown in Figure 3 to form a loop 13 at each end of the web. The terminal ends 17 of the web 12 that have been doubled back onto the central portion of the web may be secured in place in order that the web be maintained at a predetermined length. When the web 12 is of the resin filled type, the ends 17 may be spot welded in place by the local application of heat sufficient to cure the resin. It will be understood, of course, that other methods of securing the end 17, such as by sewing or the use of suitable fasteners, could be employed without departing from the spirit and scope of the invention.

The inner end portions of the web that have been doubled over to form the loops 13 may extend around the core for a substantial distance, such as between one quarter and one half of the core circumference. The inner end portions thus would be in compression between the sides of the core and the outer portion of the loop when the fastening means 15 has been tightened and secured in place. In this embodiment it has been found that the frictional contact between the inner portion of the loop 13 and the core 11 prevents the web from stretching or slipping if the joint at the ends 17 becomes broken. Thus, it is also possible to bind the web 12 to the core 11 without securing the ends 17 in place, but in the latter embodiment the advantage of having the web maintained at a predetermined length is lost. The advantages of having a web of fixed length and also substantial frictional contact may be achieved by forming the web into a single closed loop of double thickness, as indicated in dotted lines in Figure 3, thus eliminating the need for securing the ends 17. It is intended that the scope and spirit of this invention include other arrangements of end loop lengths, such as where the end 17 is doubled back less than one quarter of the circumference of the core secured in place closely adjacent the ring 14.

A coupling element or ring 14 is provided in each loop 13. The rings 14 may be of metallic or non-metallic material, but if they are metallic their corners and surfaces should be rounded so as to minimize electrical stress concentrations. The rings 14 are coupled together by fastening means 15 of adjustable length. For example, a band 19 of material such as Signode steel strapping may be employed. The ends of the strapping may be secured together by suitable means, such as conventional Signode or Gerrard clips 16. When steel strapping is employed, it may be applied by a conventional Brainard tensing tool. Such a tool shortens the length of the band 19 extending between the rings 14 by pulling the band ends into overlapping relationship and thus causes the web 12 to be pulled into tight binding contact with the core plates 11. When the web has been tightened the proper amount, a clip 16 may be used to secure band ends in place by deforming the clip with a conventional Brainard crimping tool.

The sequence of steps for making the laminated core 10 is substantially as follows:

A plurality of plates 11 are placed in face to face contacting relation. The core is then circumscribed at selected spaced locations by strips 18 of insulation. A web of insulating material 12 with rings 14 provided in its loops 13 is then placed around each of the strips of insulation 18 with the ends of the loops terminating short of each other. A coupling band 19 is then placed through the rings 14, and the ends of the band placed in overlapping relation. A Brainard tensing tool is applied to the band to tighten same and thus pull the web 12 into binding contact with the core plates 11. When the web 12 is tightened the proper amount, a fastening means, such as a Gerrard or Signode clip, is applied to the steel band by suitable tools to hold the ends thereof together. If the web 12 contains an uncured resinous material, the entire assembly may then be heated to set or cure the resin.

It should be noted that the fastening means 15 is very short in relation to the core circumference. A safety feature is thus provided in that if the web 12 should break for any reason or the fastening means 16 should become unfastened, the web 12 would fall to the bottom of the apparatus, but because of its non-conducting characteristics would not cause a short circuit between any portions of the apparatus which it contacts. Since the band 15 or rings 14 are of such small dimensions in relation to the core, when they fall to the bottom of the apparatus they will not short circuit any significant parts of the apparatus. Furthermore, if the insulation strip 18 should become dislodged from between the core 11 and web 12, no short circuit will occur.

It has thus been shown that my invention provides a unique method and means for laminating a plurality of strips of magnetic material to form a core for electrical induction apparatus. In practicing my invention, the disadvantages inherent in the technique of bolting core plates together have been eliminated thus reducing the cost and noise characteristics of the apparatus.

It will be understood, of course, that while the form of the invention herein shown and described constitutes the preferred embodiment of the invention, it is not intended herein to illustrate all of the possible equivalent forms or ramifications thereof. It will also be understood that the words used are words of description rather than of limitation, and that various changes may be made without departing from the spirit or scope of the invention herein disclosed, and it is aimed in the appended claims to cover all such changes as fall within the true spirit and scope of the invention.

What I claim as new and desire to secure by Letters Patent of the United States is:

1. In a transformer of the type having a core comprising a plurality of plates of magnetic material, the improvement in means for securing said plates together comprising a web of non-conducting material that surrounds said core, said web being folded upon itself at its ends to form a pair of loops, a coupling element being encompassed by each loop, a metallic band passing through each coupling element and being of such length that its ends overlap, and means securing the overlapping ends of said band together.

2. The combination as recited in claim 1 in which the folded ends of the web are between the main body of the web and the core.

3. In a transformer of the type having a core comprising a plurality of strips of magnetic material, the improvement in means for securing said strips together comprising a web of insulating material that partially surrounds said core, said web having its end portions folded back so as to form a loop at each end thereof, the length of said web from loop to loop being less than the circumference of said core, and fastening means of adjustable length connecting said loops.

4. The combination as recited in claim 3 in which the folded back end portions of the web are between the main body of the web and the core so as to provide fractional engagement of the folded back ends and the main body of the web.

5. In electrical induction apparatus of the type having a core comprising a plurality of strips of magnetic material, the improvement in means for securing the core strips together comprising a web of non-conducting material that surrounds said core over a major portion of its circumference and fastening means of conducting material connecting the ends of said web together.

6. A transformer comprising a plurality of plates of magnetic material in face to face contacting relation, a web of glass filled epoxy resin partially surrounding said plates, end portions of said web being folded back to form loops, the length of said loops being not less than one quarter of the circumference of said core, a connecting ring having rounded surfaces and corners being encompassed by said loops, a metallic band being passed through each of said loops with its ends over-lapping, and a deformable fastener on said band securing the ends thereof together.

No references cited.